US009562344B2

(12) United States Patent
Kumagai et al.

(10) Patent No.: US 9,562,344 B2
(45) Date of Patent: Feb. 7, 2017

(54) CONSTRUCTION MACHINE

(71) Applicant: Hitachi Construction Machinery Co., Ltd., Bunkyo-ku, Tokyo (JP)

(72) Inventors: Hiroshi Kumagai, Ryugasaki (JP); Kazuhiko Mizoguchi, Ishioka (JP); Masao Nakamura, Tsukuba (JP); Hideto Ishibashi, Itako (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/915,943

(22) PCT Filed: Jan. 14, 2015

(86) PCT No.: PCT/JP2015/050818
§ 371 (c)(1),
(2) Date: Mar. 2, 2016

(87) PCT Pub. No.: WO2015/115181
PCT Pub. Date: Aug. 6, 2015

(65) Prior Publication Data
US 2016/0215477 A1    Jul. 28, 2016

(30) Foreign Application Priority Data

Jan. 30, 2014 (JP) ................. 2014-015888

(51) Int. Cl.
*B60K 13/04* (2006.01)
*E02F 9/08* (2006.01)
(Continued)

(52) U.S. Cl.
CPC ............. *E02F 9/0866* (2013.01); *B60K 13/04* (2013.01); *E02F 9/0816* (2013.01);
(Continued)

(58) Field of Classification Search
CPC ...... B60K 13/04; F01N 3/035; F01N 13/1805; F01N 13/1822; F01N 2590/08; F01N 2340/04; F01N 3/2066; F01N 2610/02; F16M 13/02; E02F 3/283; E02F 9/0866; E02F 9/0883
(Continued)

(56) References Cited

U.S. PATENT DOCUMENTS 4,060,143 A * 11/1977 Matsumoto ............ B60K 13/04
                                                                180/296
4,133,547 A *  1/1979 Fox ........................ B60K 13/04
                                                                123/41.64
(Continued)

FOREIGN PATENT DOCUMENTS

JP       2009-35111 A      2/2009
JP       2011-231592 A    11/2011
(Continued)

OTHER PUBLICATIONS

International Search Report (PCT/ISA/210) issued in PCT Application No. PCT/JP2015/050818 dated Mar. 17, 2015, with English translation (four (4) pages).

*Primary Examiner* — Hau Phan
*Assistant Examiner* — Jacob Meyer
(74) *Attorney, Agent, or Firm* — Crowell & Moring LLP

(57) ABSTRACT

A post-treatment device mounting frame on which an exhaust gas post-treatment device is mounted is constituted by a front mounting leg, a rear mounting leg, and a deck connecting the front and rear mounting legs to each other. A vertical leg part of the front mounting leg is mounted on a front vertical leg part mounting plate of a right front extension beam. A lateral leg part of the front mounting leg is mounted on a front lateral leg part mounting plate of a right front engine support bracket. A vertical leg part of the rear mounting leg is mounted on a rear vertical leg part mounting
(Continued)

plate of a right rear extension beam. A lateral leg part of the rear mounting leg is mounted on a rear lateral leg part mounting plate of a right rear engine support bracket. Therefore, the post-treatment device mounting frame is firmly mounted in a state of four-point support on a revolving frame.

4 Claims, 9 Drawing Sheets

(51) Int. Cl.
  *F01N 13/18* (2010.01)
  *F01N 13/00* (2010.01)
(52) U.S. Cl.
  CPC ........ *F01N 13/1805* (2013.01); *F01N 13/009* (2014.06); *F01N 2470/18* (2013.01); *F01N 2590/08* (2013.01)
(58) Field of Classification Search
  USPC ........................................ 180/296, 89.2, 309
  See application file for complete search history.

(56) References Cited

U.S. PATENT DOCUMENTS

| | | | | |
|---|---|---|---|---|
| 7,966,979 B2* | 6/2011 | Olsen | ................ | F01N 13/00 123/195 A |
| 8,141,535 B2* | 3/2012 | Olsen | ................ | F01N 13/1805 123/195 A |
| 8,191,668 B2* | 6/2012 | Keane | ................ | B60K 13/04 180/296 |
| 8,201,398 B2* | 6/2012 | Boeckenhoff | ............ | F01N 3/021 60/299 |
| 8,381,865 B2* | 2/2013 | Okada | ................ | E02F 9/00 180/296 |
| 8,420,019 B2* | 4/2013 | Saito | ................ | E02F 9/0883 422/180 |
| 8,516,807 B2* | 8/2013 | Kosaka | ............... | F01N 13/1822 60/297 |
| 8,695,748 B2* | 4/2014 | Togo | ........................ | B60K 5/00 180/309 |
| 8,720,638 B1* | 5/2014 | Nakagami | ............. | B60K 11/00 180/309 |
| 8,820,468 B2* | 9/2014 | Sekiya | ................ | B60K 13/04 180/309 |
| 8,827,029 B1* | 9/2014 | Nakagami | ............. | E02F 9/0866 180/296 |
| 8,851,224 B2* | 10/2014 | Hayashi | ................ | B60K 13/04 180/296 |
| 8,857,557 B2* | 10/2014 | Sakamoto | ............. | B60K 11/04 180/296 |
| 8,899,017 B2* | 12/2014 | Himoto | ................ | F01N 3/2066 60/282 |
| 8,915,328 B2* | 12/2014 | Okada | ................ | E02F 9/0866 180/309 |
| 8,950,535 B2* | 2/2015 | Harada | ................ | E02F 9/0866 180/296 |
| 8,979,125 B2* | 3/2015 | Sato | ................ | E02F 9/0866 180/196 |
| 8,985,262 B2* | 3/2015 | Sekiya | ................ | B60K 13/04 180/309 |
| 9,061,582 B2* | 6/2015 | Sawada | ................ | B60K 13/04 180/309 |
| 9,175,455 B2* | 11/2015 | Sakai | ................ | E02F 3/7631 |
| 9,200,550 B2* | 12/2015 | Mori | ................ | E02F 9/0866 |
| 2010/0031644 A1* | 2/2010 | Keane | ................ | B60K 13/04 60/295 |
| 2010/0186381 A1* | 7/2010 | Charles | ................ | F01N 3/025 60/282 |
| 2010/0186394 A1* | 7/2010 | Harrison | ................ | F01N 3/103 60/299 |
| 2012/0247861 A1* | 10/2012 | Mizuno | ................ | B60K 13/04 180/296 |
| 2013/0213725 A1* | 8/2013 | Togo | ........................ | B60K 5/00 180/309 |
| 2013/0213726 A1* | 8/2013 | Okada | ................ | E02F 9/0866 180/309 |
| 2013/0305688 A1* | 11/2013 | Kosaka | ............... | F01N 13/1822 60/272 |
| 2013/0319787 A1 | 12/2013 | Kobayashi et al. | | |
| 2013/0330237 A1* | 12/2013 | Lamps | ................ | F01N 13/008 422/119 |
| 2013/0343853 A1* | 12/2013 | Sato | ................ | E02F 9/0866 414/719 |
| 2014/0020972 A1* | 1/2014 | Masumoto | ............. | B60K 11/06 180/309 |
| 2014/0102085 A1* | 4/2014 | Mori | ................ | E02F 9/0866 60/301 |
| 2014/0174057 A1* | 6/2014 | Ludeman | ................ | F01N 3/106 60/274 |
| 2014/0182963 A1* | 7/2014 | Sekiya | ................ | B60K 13/04 180/309 |
| 2014/0290220 A1* | 10/2014 | Ozaki | ........................ | F01N 3/08 60/282 |
| 2014/0290781 A1* | 10/2014 | Ozaki | ........................ | F16L 3/08 138/106 |
| 2014/0291057 A1* | 10/2014 | Nakagami | ............. | E02F 9/0866 180/309 |
| 2014/0305110 A1* | 10/2014 | Himoto | ................ | E02F 9/0833 60/324 |
| 2014/0326527 A1* | 11/2014 | Harada | ................ | E02F 9/0866 180/309 |
| 2015/0000256 A1* | 1/2015 | Kobayashi | ................ | F01N 3/10 60/282 |
| 2015/0075894 A1* | 3/2015 | Kamimae | ............. | E02F 9/0833 180/309 |
| 2015/0211209 A1 | 7/2015 | Okuda et al. | | |

FOREIGN PATENT DOCUMENTS

| | | |
|---|---|---|
| JP | 2012-97413 A | 5/2012 |
| JP | 2012-171596 A | 9/2012 |
| JP | 5296913 B1 | 9/2013 |

* cited by examiner

CONSTRUCTION MACHINE

TECHNICAL FIELD

The present invention relates to a construction machine such as a hydraulic excavator, a wheel loader and the like and particularly to a construction machine provided with an exhaust gas post-treatment device for executing post-treatment to an exhaust gas exhausted from an engine.

BACKGROUND ART

In general, a hydraulic excavator as a typical example of a construction machine has its vehicle body constituted by an automotive lower traveling structure and an upper revolving structure rotatably mounted on the lower traveling structure. A working mechanism performing an excavating work and the like is liftably provided on a front side of the upper revolving structure.

The upper revolving structure is largely constituted by a revolving frame forming a support structural body, a cab provided on a front side of the revolving frame and is on which an operator gets onboard, an engine mounted on a rear side of the revolving frame, a hydraulic pump mounted on the engine, an exhaust gas post-treatment device connected to an exhaust side of the engine through an exhaust pipe, and a housing cover provided on the revolving frame covering these devices.

Here, an exhaust gas purifying device for removing harmful substances contained in the exhaust gas, a muffler device (exhaust muffler) for reducing a noise of the exhaust gas and the like are known as the exhaust gas post-treatment device. Moreover, a particulate matter removing device for removing particulate matters (PM), a NOx purifying device for purifying nitrogen oxides (NOx) and the like can be used singularly or in combination as appropriate, as the exhaust gas purifying device.

In recent years, in order to cope with exhaust gas control, a size of the exhaust gas post-treatment device tends to become larger. Thus, a constitution of mounting the heavy exhaust gas post-treatment device on a structure other than the engine or a structure such as the revolving frame and the like, for example, is adopted (see Patent Document 1).

PRIOR ART DOCUMENT

Patent Document

Patent Document 1: Japanese Patent Laid-Open No. 2011-231592 A

SUMMARY OF THE INVENTION

Incidentally, in the conventional art described above, since the exhaust gas post-treatment device is mounted on the revolving frame through a bracket, rigidity for supporting the heavy exhaust gas post-treatment device is not sufficient. Therefore, there occurs the problem that the exhaust gas post-treatment device mounted on the bracket swings largely, and mounting accuracy of the exhaust, pipe connecting the engine and the exhaust gas post-treatment device lowers while the construction machine is operating.

In view of the aforementioned problem with the conventional art, it is an object of the present invention to provide a construction machine which can reliably support the exhaust gas post-treatment device with sufficient rigidity and improve the mounting accuracy of the exhaust pipe connecting the engine and the exhaust gas post-treatment device.

(1) In order to solve the aforementioned problem, the present invention is applied to a construction machine comprising: a vehicle body frame forming a support structural body of a vehicle body; an engine mounted on the vehicle body frame in a laterally placed state extending in the left and right direction; a hydraulic pump mounted on the engine by being located on one side of the engine in a left and right direction; an exhaust gas post-treatment, device connected to the engine through an exhaust pipe and executing post-treatment to the exhaust gas exhausted from the engine; and a post-treatment device mounting frame provided on the vehicle body frame and on which the exhaust gas post-treatment device is mounted; wherein the vehicle body frame includes: a center frame having a bottom plate and left and right vertical plates installed upright on the bottom plate and extending in a front and rear direction, left and right side frames arranged on both left and right sides interposing the center frame and extending in the front and rear direction, a plurality of extension beams extending in the left and right direction at an interval in the front and rear direction in order to connect the left and right side frames and the center frame to each other, and a front, engine support bracket and a rear engine support bracket provided separately to a front side and a rear side on the center frame and supporting the engine through a vibration isolating member.

A characteristic feature of the present invention is that the post-treatment device mounting frame includes: a front mounting leg mounted on the front engine support bracket and the front extension beam, located in the vicinity of the front engine support bracket in the plurality of extension beams, respectively, a rear mounting leg mounted on the rear engine support bracket and the rear extension beam located in the vicinity of the rear engine support bracket in the plurality of extension beams, respectively, and a deck extending in the front and rear direction between the front mounting leg and the rear mounting leg and connecting upper part positions of the front mounting leg and the rear mounting leg, and the exhaust gas post-treatment device is mounted on the deck of the post-treatment device mounting frame.

With this arrangement, the front mounting leg and the rear mounting leg constituting the post-treatment device mounting frame are mounted on the extension beam and the engine support bracket constituting the vehicle body frame, respectively, and the front mounting leg and the rear mounting leg are connected by the deck extending in the front and rear direction. Therefore, the post-treatment device mounting frame can be firmly mounted on the vehicle body frame in a state of four-point support and thus, the heavy exhaust gas post-treatment device can be supported by this post-treatment device mounting frame with sufficient rigidity.

Moreover, the engine is mounted on this engine support bracket through the vibration isolating member. Thus, by mounting the mounting leg of the post-treatment device mounting frame by using this engine support bracket, accuracy of a mounting position of the exhaust gas post-treatment device to the engine can be improved. As a result, the mounting accuracy of the exhaust pipe connecting the engine and the exhaust gas post-treatment device to each other can be improved.

(2) According to the present invention, the deck of the post-treatment device mounting frame is constituted to extend in the front and rear direction across the hydraulic pump.

With this arrangement, by mounting the exhaust gas post-treatment device on the deck extending in the front and rear direction across the hydraulic pump, the exhaust gas post-treatment device can be arranged on the upper side of the hydraulic pump. As a result, even in a construction machine in which a sufficient space cannot be ensured around the engine, for example, the exhaust gas post-treatment device can be arranged by effectively utilizing the space formed on the upper side of the hydraulic pump.

(3) According to the present invention, the deck of the post-treatment device mounting frame is constituted by a mounting stand on which the exhaust gas post-treatment device is mounted and a partition member covering by the mounting stand to above the hydraulic pump and partitioning the hydraulic pump from the exhaust gas post-treatment device.

With this arrangement, the exhaust gas post-treatment device mounted on the deck of the post-treatment device mounting frame can be partitioned from the hydraulic pump by the partition member. Therefore, even if hydraulic oil is splashed from a connection portion between the hydraulic pump and a hydraulic hose, for example, adhesion of the hydraulic oil to the exhaust gas post-treatment device and causing a misfire can be prevented, and reliability of the construction machine can be improved.

(4) According to the present invention, the front mounting leg of the post-treatment device mounting frame is constituted by a vertical leg part extending in the vertical direction and having a lower end portion mounted on the front extension beam and a lateral leg part extending from an upper end of the vertical leg part toward the center frame and mounted on the front engine support bracket; the rear mounting leg of the post-treatment device mounting frame is constituted by a vertical leg part extending in the vertical direction and having a lower end portion mounted on the rear extension beam and a lateral leg part extending from the upper end of the vertical leg part toward the center frame and mounted on the rear engine support bracket; and the deck of the post-treatment device mounting frame is constituted to have its front side mounted on an upper part of the lateral leg part constituting the front mounting leg and its rear side mounted on the upper part of the lateral leg part constituting the rear mounting leg.

With this arrangement, an interval in the left and right direction between a mounting position between the vertical leg part of the front mounting leg and the vehicle body frame and a mounting position between the lateral leg part of the front mounting leg and the vehicle body frame can be ensured large, and an interval in the left and right direction between a mounting position between the vertical leg part of the rear mounting leg and the vehicle body frame and a mounting position between the lateral leg part of the rear mounting leg and the vehicle body frame can be ensured large. Accordingly, the post-treatment device mounting frame can suppress vibration in the left and right direction by the front mounting leg and the rear mounting leg, and the deck connecting the front mounting leg and the rear mounting leg can suppress vibration in the front and rear direction, and thus, the exhaust gas post-treatment device can be stably supported for a long period of time.

BRIEF DESCRIPTION OF THE DRAWINGS

FIG. 10 is a perspective view showing the revolving frame, a hydraulic pump, the post-treatment device mounting frame, the exhaust gas post-treatment device and the like.

MODE FOR CARRYING GUT THE INVENTION

Hereinafter, a construction machine according to an embodiment of the present, invention will be in detail explained with reference to the accompanying drawings by taking a crawler-type hydraulic excavator as an example.

Figure 1:
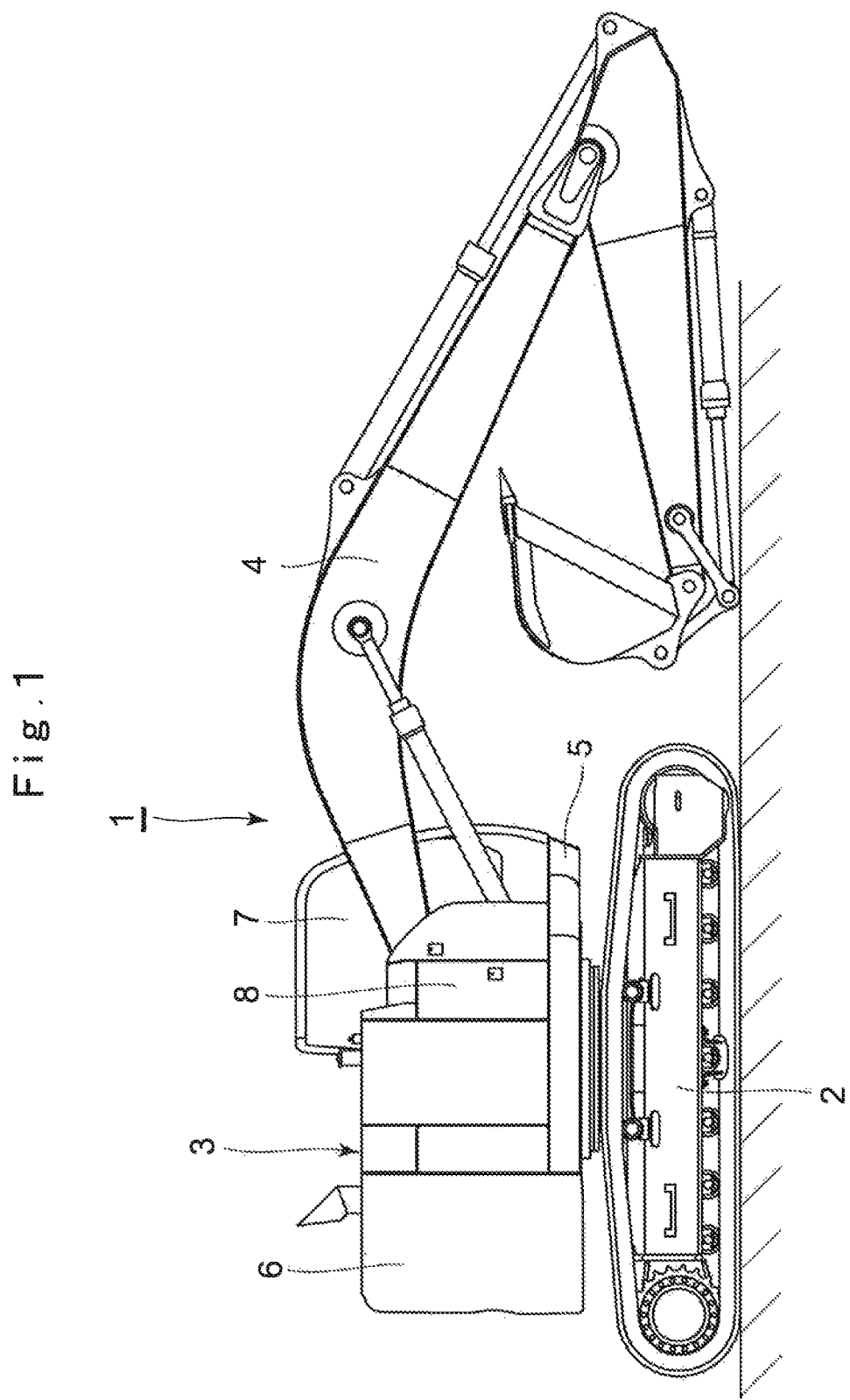
FIG. 1 is a front view showing a hydraulic excavator to which an embodiment of the present invention is applied.

In FIG. 1, a hydraulic excavator 1 is a typical example of a construction machine, and a vehicle body of this hydraulic excavator 1 is constituted by including an automotive crawler-type lower traveling structure 2 and an upper revolving structure 3 mounted, rotatably on the lower traveling structure 2. A working mechanism 4 is liftably provided on a front side of the upper revolving structure 3, and an excavating work of earth and sand and the like can be performed by this working mechanism 4.

The upper revolving structure 3 is provided with a revolving frame 5 as a vehicle body frame rotatably mounted on the lower traveling structure 2. A counterweight 6 for taking a weight balance with the working mechanism 4 is provided on a rear end side of the revolving frame 5. A cab 7 on which an operator gets onboard is provided on the front left side of the revolving frame 5. A housing cover 8 accommodating an engine 9, an exhaust gas post-treatment device. 13, a post-treatment device mounting frame 20 and the like which will be described, later is provided therein on a front side of the counterweight 6.

Figure 2:
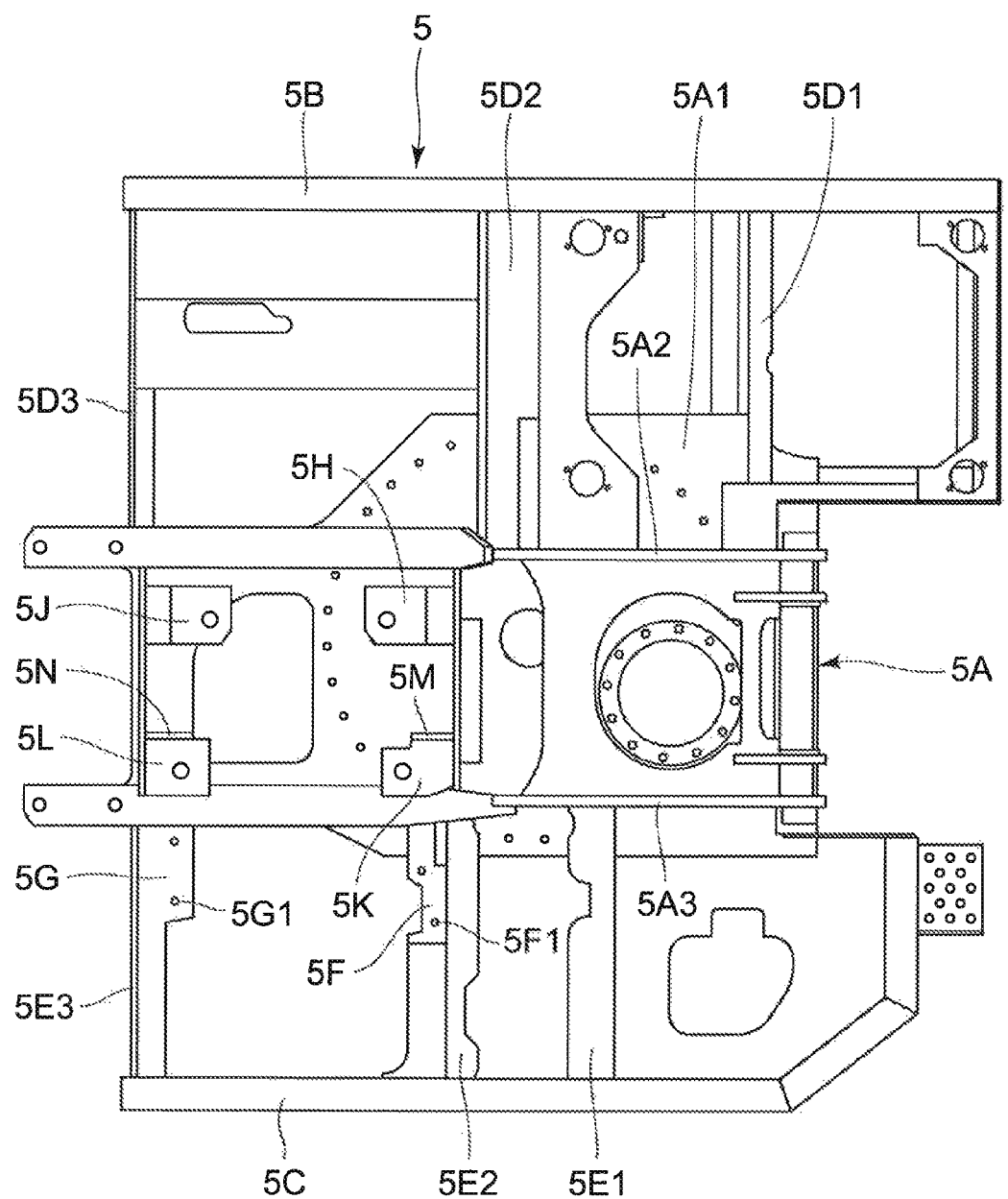
FIG. 2 is a plan view showing a revolving frame of the hydraulic excavator as a single body.

As shown in FIG. 2, the revolving frame 5 is constituted by including a center frame 5A arranged at a center part in the left and right direction and extending in a front and rear direction, a left side frame 5B arranged on the left side and extending in the front and rear direction interposing the center frame 5A, and a right side frame 5C arranged on the right side and extending in the front and rear direction interposing the center frame 5A. Here, the center frame 5A is constituted by including a thick bottom plate 5A1 and a left vertical plate 5A2 and a right vertical plate 5A3 installed upright on the bottom plate 5A1 and extending in the front and rear direction while facing each other in the left and right direction.

A plurality of left extension beams 5D1, 5D2 and 5D3 extending in the left and right direction are provided at intervals in the front and rear direction between the center frame 5A and the left side frame 5E. The left side frame 5B is mounted on the center frame 5A through each of the left extension beams 5D1, 5D2 and 5D3. On the other hand, a plurality of right extension beams 5E1, 5E2 and 5E3 extending in the left and right direction are provided at intervals in the front and rear-direct ion between the center frame 5A and the right side frame 5C. The right side frame 5C is mounted on the center frame 5A through each of the right extension beams 5E1, 5E2 and 5E3.

Figure 6:
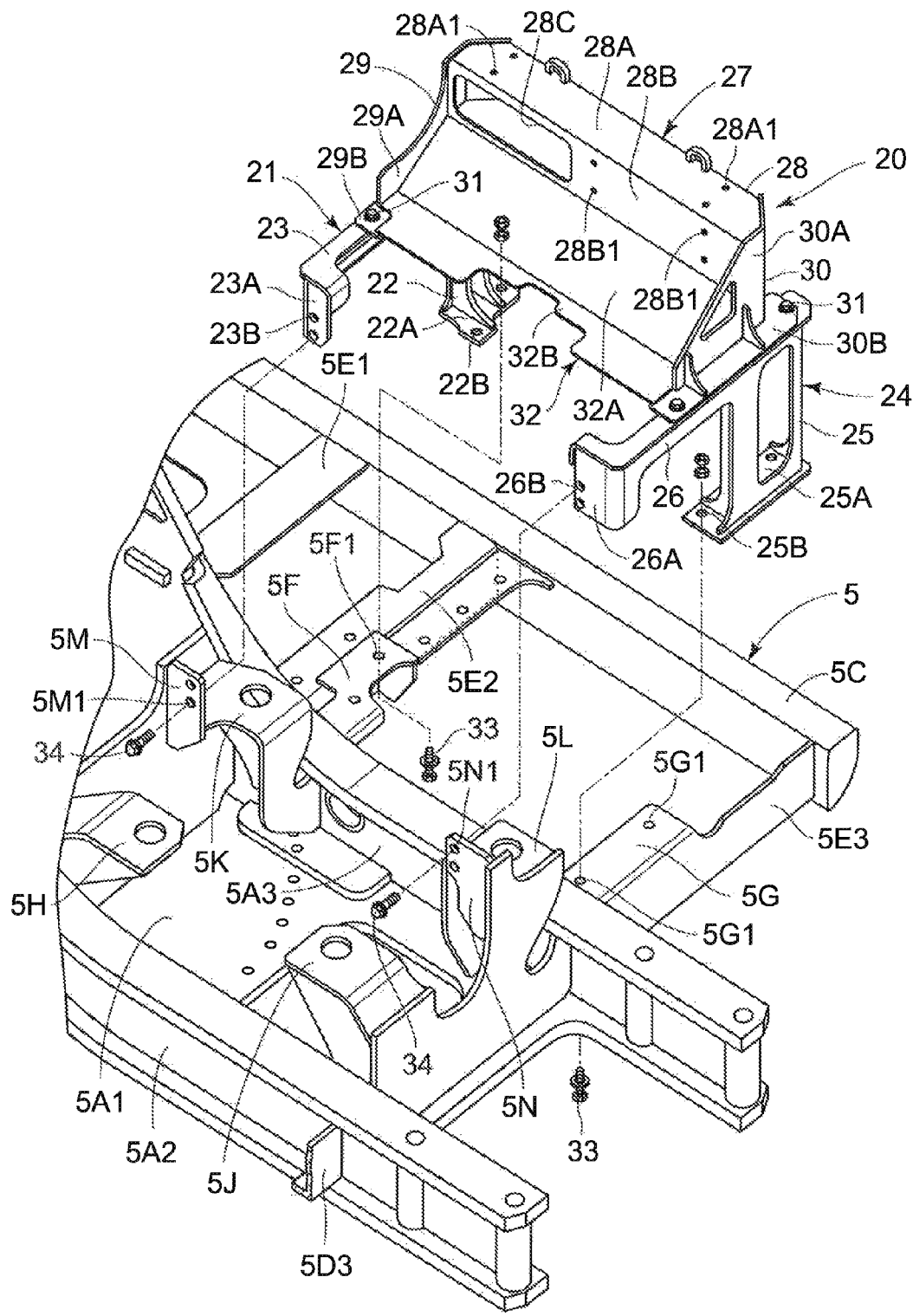
FIG. 6 is a perspective view showing a state in which the post-treatment device mounting frame is removed from the revolving frame.

As shown in FIG. 2 and FIG. 6, the right front extension beam 5E2 is arranged in the vicinity of a right front engine support bracket 5K which will be described later. Here, the right front extension beam 5E2 corresponds to an extension beam located in the middle among the three right extension beams 5E1, 5E2 and 5E3. This right front extension beam 5E2 is defined (named) in relation with a front mounting leg 21 which will be described later. A front vertical leg part mounting plate 5F extending in the left and right direction from the right vertical plate 5A3 of the center frame 5A toward the right side frame 5C is integrally provided on an upper end of the right front, extension beam 5E2. A vertical leg part 22 of the front, mounting leg 21 which will be described later is mounted on this front vertical leg part mounting plate 5F. Two bolt insertion holes 5F1 penetrating in the vertical direction are drilled at an interval in the left and right direction in the front vertical leg part mounting plate 5F.

The right rear extension beam 5E3 is arranged in the vicinity of a right rear engine support bracket 5L which will be described later. Here, the right rear extension beam 5E3 corresponds to an extension beam located on the rear end among the three right extension beams 5E1, 5E2 and 5E3. This right rear extension beam 5E3 is defined (named) in relation with a rear mounting leg 24 which will be described later. A rear vertical leg part mounting plate 5G extending in the left and right direction from the right vertical plate 5A3 of the center frame 5A toward the right side frame 5C is integrally provided on an upper end of the right rear extension beam 5E3. This rear vertical leg part mounting plate 5G is on which a vertical leg part 25 of the rear mounting leg 24 which will be described later is mounted. In the rear vertical leg part, mounting plate 5G, two bolt insertion holes 5G1 penetrating in the vertical direction are drilled at an interval in the left and right direction.

A left front engine support bracket 5H and a left rear engine support bracket 5J located on the rear side of the left front engine support bracket 5H are provided on a rear part side of the center frame 5A and in the vicinity of the left vertical plate 5A2. The right front engine support bracket 5K and a right rear engine support bracket 5L located on the rear side of the right front engine support bracket 5K are provided, on the rear part side of the center frame 5A and in the vicinity of the right vertical plate 5A3. As described, above, on the rear part side of the center frame 5A, the left and right front engine support brackets 5H and 5K and the left and right, rear engine support brackets 5J and 5L are arranged separately from each other to front and rear between the left vertical plate 5A2 and the right vertical plate 5A3. These four engine support brackets 5H, 5J, 5K and 5L support the engine 9 through the vibration isolating member 10 which will be described later.

Here, as shown in FIG. 6, on a left end portion of the right front engine support bracket 5K, a front lateral leg part mounting plate 5M is integrally provided at a position upper than the front vertical leg part mounting plate 5F. The lateral leg part 23 of the front mounting leg 21 which will be described later is mounted on the front lateral leg part mounting plate 5M, and in this front lateral leg part mounting plate 5M, two bolt insertion holes SMI penetrating in the left and right direction is drilled separately in the vertical direction. On a left end portion of the right rear engine support bracket 5L, a rear lateral leg part mounting plate 5N is integrally provided at a position upper than the rear vertical leg part mounting plate 5G. The lateral leg part 26 of the rear mounting leg 24 which will be described later is mounted on the rear lateral leg part mounting plate 5N, and in this rear lateral leg part mounting plate 5N, two bolt insertion holes 5N1 penetrating in the left and right direction is drilled separately in the vertical direction.

The engine 9 is provided on the rear side of the revolving frame 5. This engine 3 is constituted by a diesel engine. The engine 9 is supported elastically with respect to the left front engine support bracket 5H provided on the revolving frame 5, the left rear engine support bracket 5J, the right front engine support bracket 5K and the right rear engine support bracket 5L through the vibration isolating member 10, respectively. The engine 9 is mounted on the revolving frame 5 in the laterally placed state with a crank shaft (not shown) extending in the left and right direction.

Here, a hydraulic pump 11 is mounted on one side (right side) of the engine 9 in the left and right direction. The hydraulic pump 11 supplies pressurized oil for operation toward various hydraulic devices mounted on the hydraulic excavator 1 by being driven by the engine 9. A cooling fan 9A driven by the engine 9 is provided on the other side (left side) of the engine 9 in the left and right direction. The cooling fan 9A sections cooling air into the housing cover 8 and can cool a heat exchanger such as a radiator, an oil cooler and the like (none of them is shown) by this cooling air.

On the other hand, the exhaust gas exhausted from the engine 9 is exhausted to an outside through an exhaust pipe 12 connected to an exhaust side of the engine 9. The exhaust gas of the engine 9 made of the diesel engine contains harmful substances such as nitrogen oxides (NOx) and the like. Thus, the exhaust gas post-treatment device 13 which will be described later is connected to the exhaust pipe 12 of the engine 9 and constituted such that the harmful substances are removed by this exhaust gas post-treatment device 13.

Figure 8:
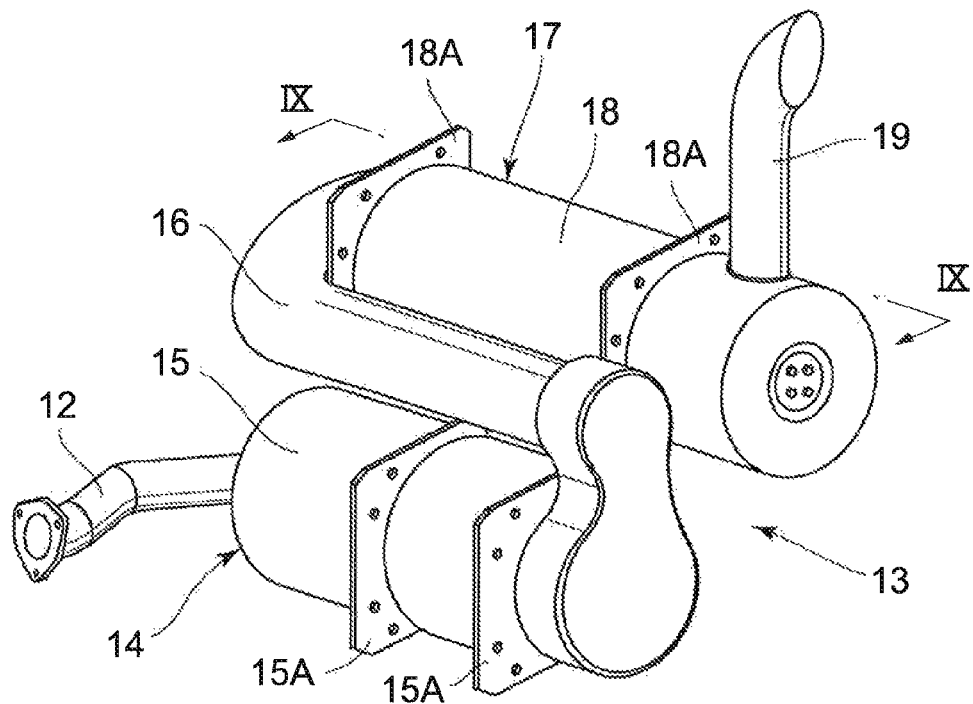
FIG. 8 is a perspective view showing the exhaust gas post-treatment device as a single body.
Figure 9:
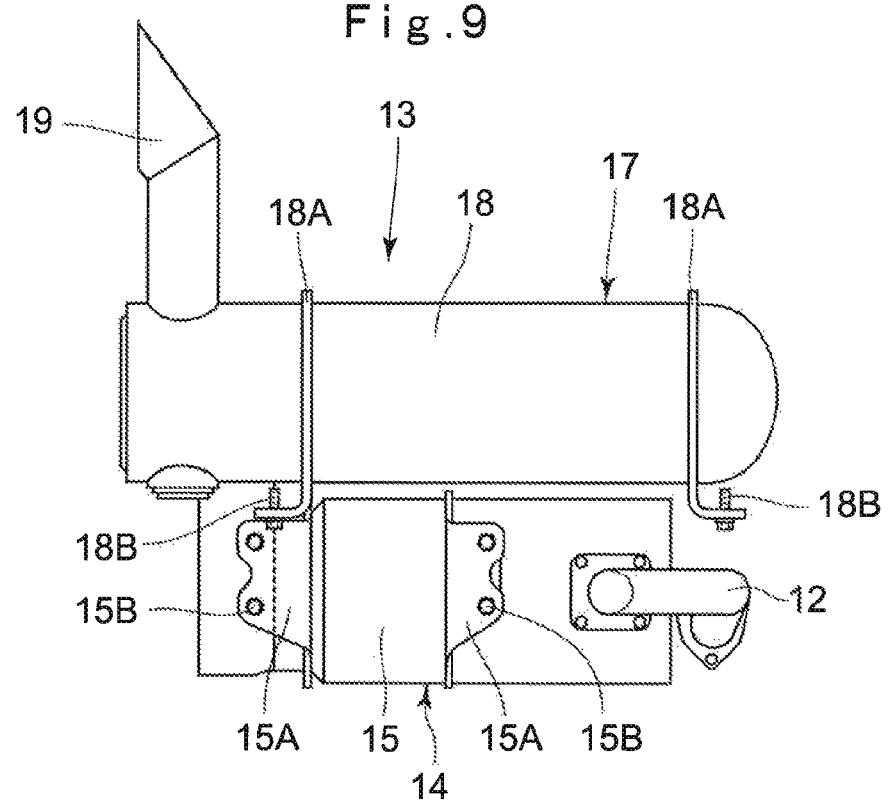
FIG. 9 is a side view of the exhaust gas post-treatment device seen from an arrow IX-IX in FIG. 8.
Figure 10:
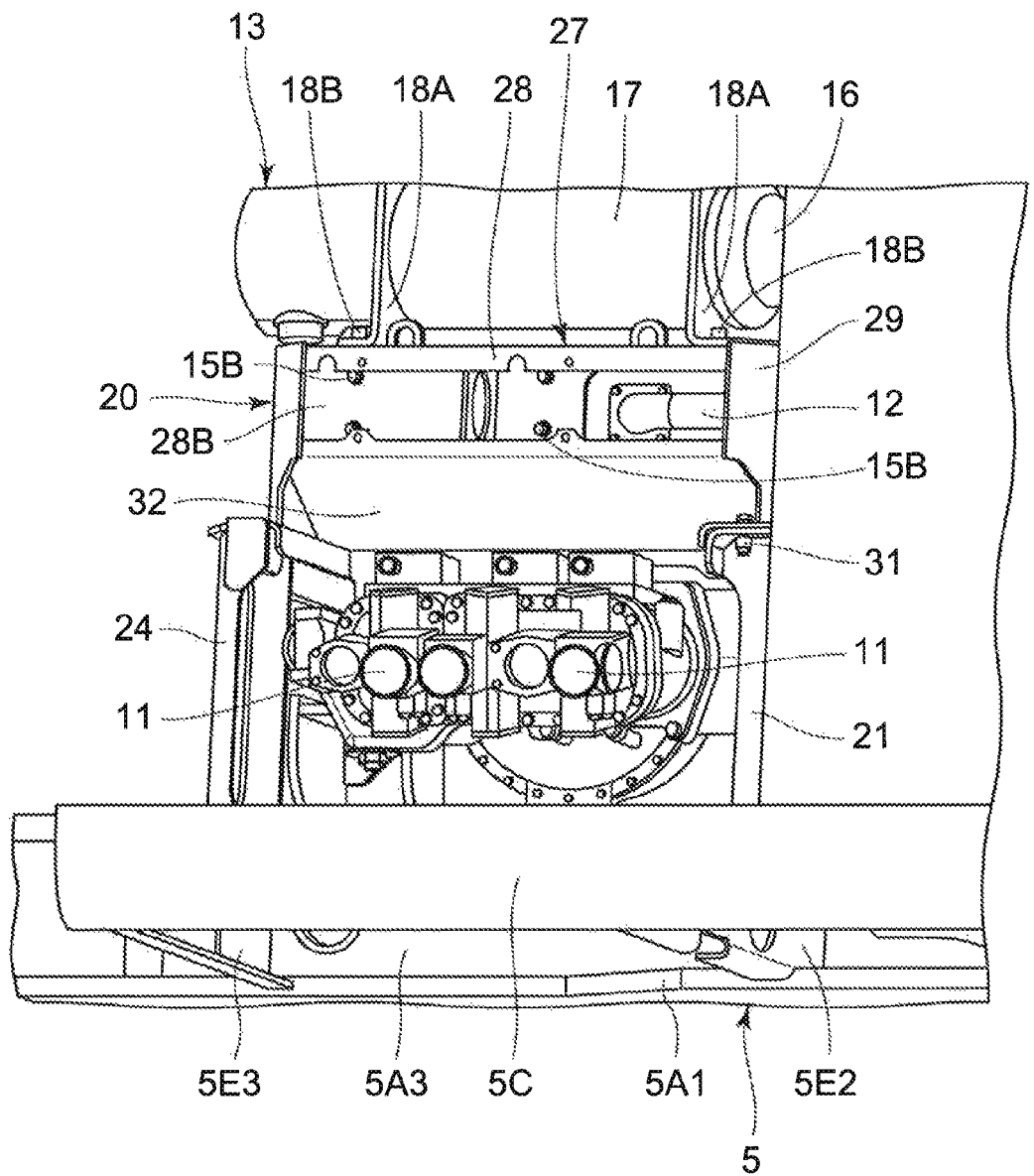

The exhaust gas post-treatment device 13 is connected to the engine 9 through the exhaust pipe 12. The exhaust gas post-treatment device 13 is to execute post-treatment to the exhaust gas exhausted from the engine 9. Here, as shown in FIG. 8 and FIG. 9, the exhaust gas post-treatment device 13 includes a first exhaust gas post-treatment device 14 and a second exhaust gas post-treatment device 17 which will be described later. This exhaust gas post-treatment device 13 is mounted on the revolving frame 5 through the post-treatment device mounting frame 20 which will be described later.

The first exhaust gas post-treatment device 14 is connected to an outlet port side of the exhaust pipe 12. The first exhaust gas post-treatment device 14 is arranged on an upper side of the hydraulic pump 11 in a state mounted on a side surface 28B of a mounting stand 28 which will be described later. This first exhaust gas post-treatment device 14 includes a cylindrical cylinder body 15 extending in the front and rear direction.

The cylinder body 15 is formed as a sealed container with both ends closed. A tubular inlet port (not shown) protruding to an outer side of the cylinder body 15 in a radial direction is provided on a front side portion which forms an upstream, side of the cylinder body 15, and the exhaust pipe 12 is connected to this inlet port. Two brackets 15A bent in an L-shape are fixed, on the other hand, on the outer periphery side of the cylinder body 15 at an interval in an axial direction. The first exhaust gas post-treatment device 14 is mounted on the side surface 28B of the mounting stand 28 which will be described later by a bolt and nut 15R inserted through each of these brackets 15A.

A connection pipe 16 connects the first exhaust gas post-treatment device 14 and the second exhaust gas post-treatment device 17 to each other. The connection pipe 16 is arranged on an upper side of the cylinder body 15 constituting the first exhaust gas-post-treatment device 14.

The second exhaust gas post-treatment device 17 is arranged, on a diagonally right upper side of the first exhaust gas post-treatment device 14. The second exhaust gas post-treatment device 17 is arranged on an upper side of the hydraulic pump 11 in a state mounted on an upper surface 28A of the mounting stand 28 which will be described later. This second exhaust gas post-treatment device 17 is connected to an outlet port side of the connection pipe 16. This second exhaust gas post-treatment device 17 includes a cylindrical cylinder body IS extending in the front and rear direction in parallel with the cylinder body 15 of the first exhaust gas post-treatment device 14 and a tail pipe 19 protruding toward an upper side from the cylinder body 18.

Figure 3:
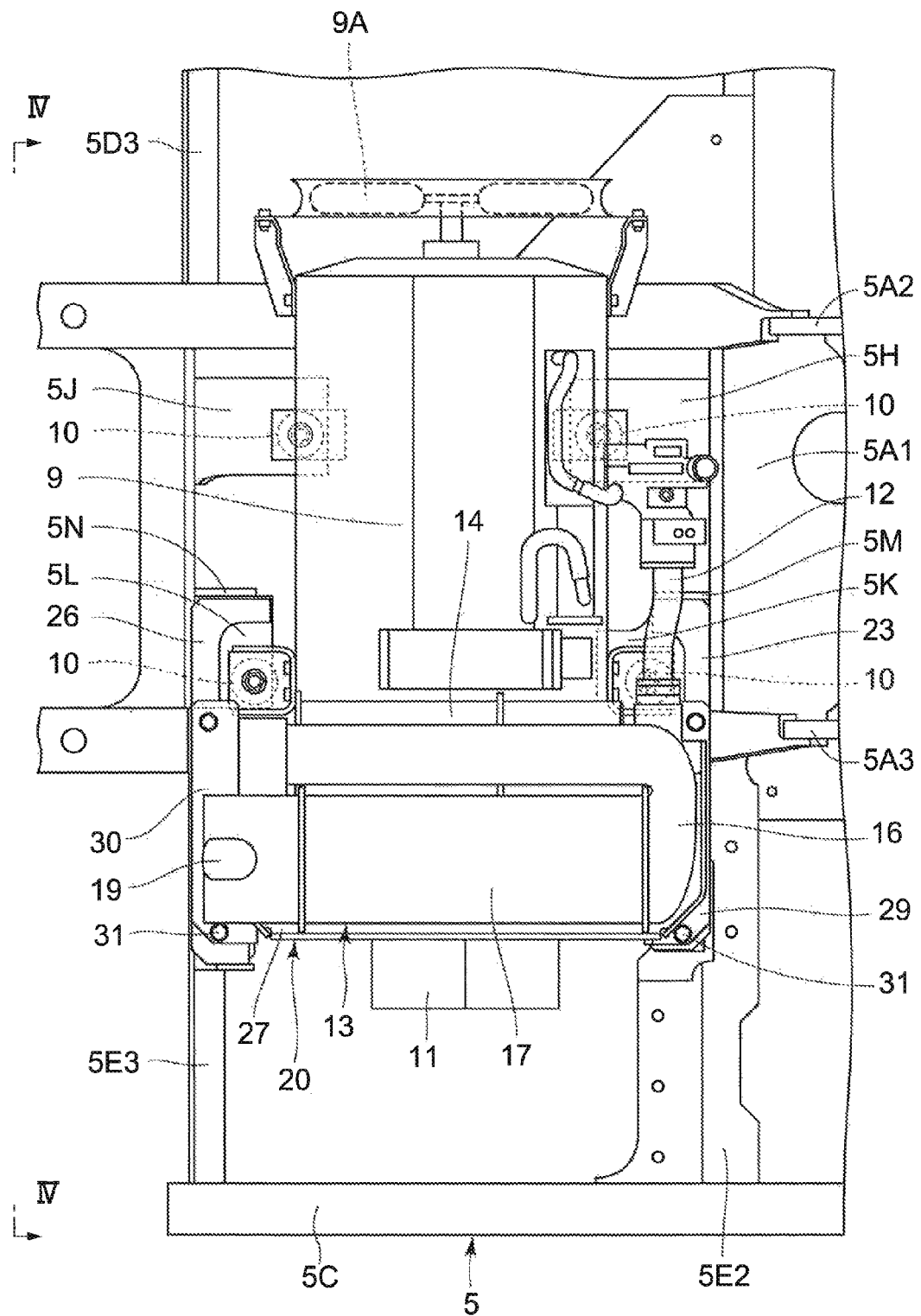
FIG. 3 is a plan view showing a state in which an engine, a post-treatment device mounting frame, an exhaust gas post-treatment device and the like are mounted at rear part positions of the revolving frame.
Figure 4:
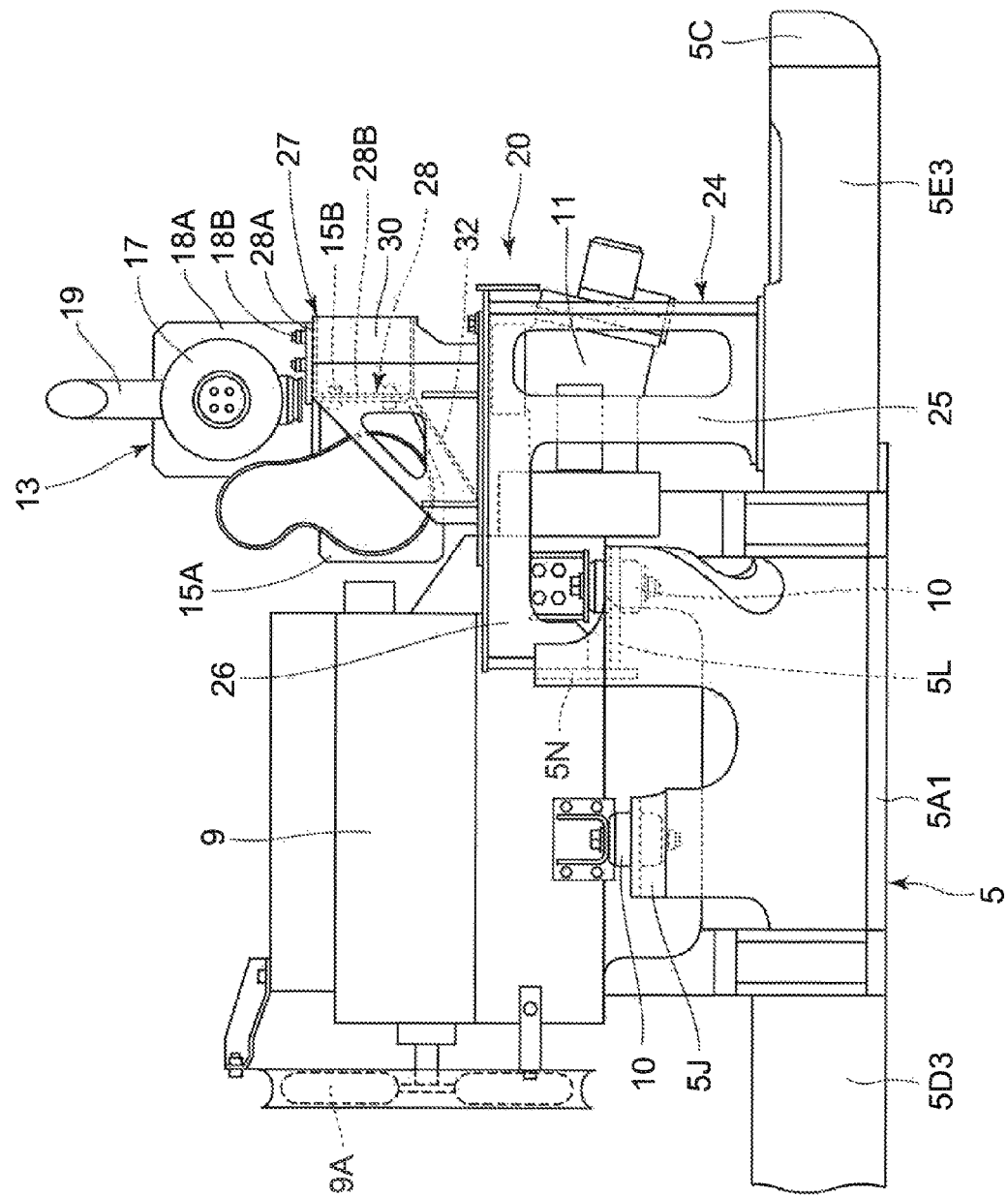
FIG. 4 is a rear view of the revolving frame, the engine, the post-treatment device mounting frame, the exhaust, gas post-treatment device and the like seen from an arrow IV-IV in FIG. 3.

The cylinder body 18 is formed as a sealed container with its both ends closed. Two brackets 18A bent in an L-shape are fixed on the outer periphery side of the cylinder body 18 at an interval in an axial direction. The second exhaust gas post-treatment device 17 is mounted on the upper surface 28A of the mounting stand 28 which will be described later by a bolt and nut 18B inserted through each of these brackets ISA. As shown in FIG. 3 and FIG. 4, the first exhaust, post-treatment device 14 and the second exhaust gas post-treatment device 17 are arranged so that they are partially overlapped with each other in the vertical direction when seen from above.

The tail pipe 19 is arranged on a rear side portion which is the downstream side of the cylinder body 18. One end (lower end) of the tail pipe 19 in the length direction is inserted into the cylinder body 18, and the other end (upper end) in the length direction protrudes upward in the radial direction from the cylinder body 18.

Subsequently, the post-treatment device mounting frame used in this embodiment in order to mount the exhaust gas post-treatment device 13 on the revolving frame 5 will be described.

Figure 5:
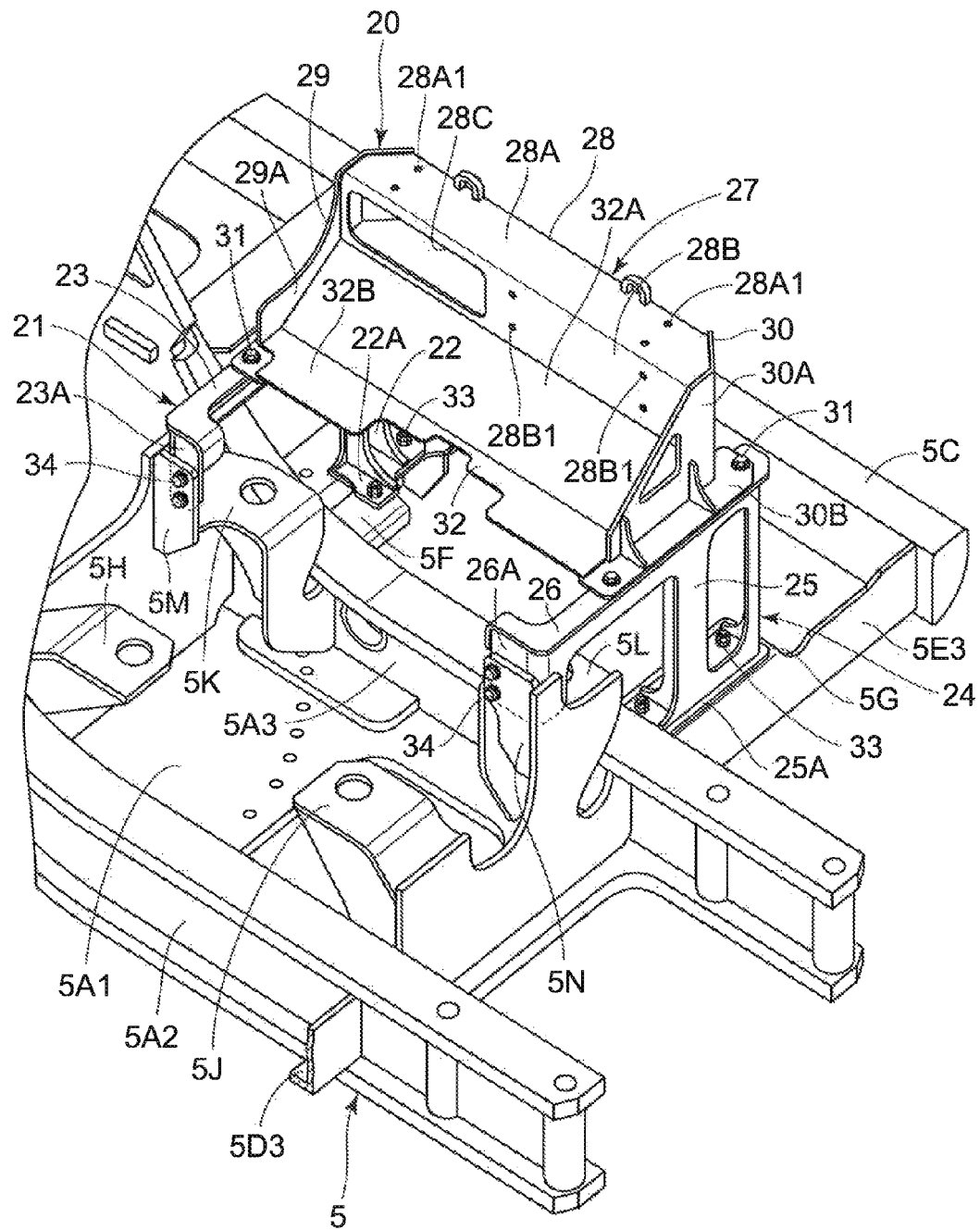
FIG. 5 is a perspective view showing a state in which the post-treatment device mounting frame is mounted on the revolving frame.
Figure 7:
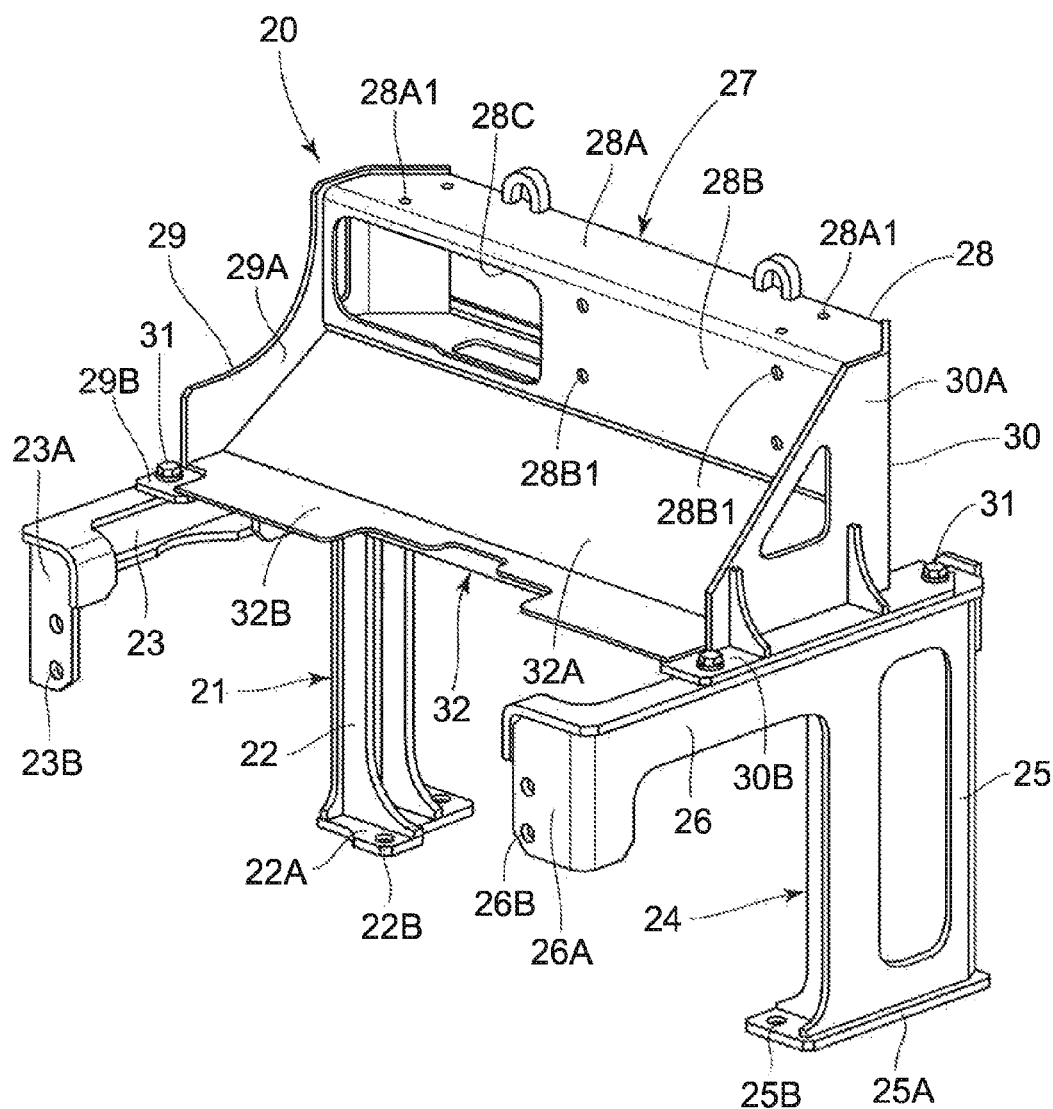
FIG. 7 is a perspective view showing the post-treatment, device mounting frame as a single body.

The post-treatment device mounting frame 20 is disposed on the revolving frame 5 and supports the exhaust gas post-treatment device 13. Here, as shown in FIG. 5 to FIG. 7, the post-treatment device mounting frame 20 includes the front mounting leg 21, the rear mounting leg 24, and the deck 27 which will be described later.

The front mounting leg 21 constitutes a front side of the post-treatment device mounting frame 20. This front mounting leg 21 is constituted by the vertical leg part 22 extending in the vertical direction and the lateral leg part 23 extending from the upper end of the vertical leg part 22 toward the center frame 5A in the left and right direction. The front mounting leg 21 is formed a substantial L-shape as a whole. A flat-plate shaped lower flange plate 22A is provided on a lower end portion, of the vertical leg part 22, and this lower flange plate 22A is in contact with the front vertical leg part mounting plate 5F provided on the right front extension beam 5E2 of the revolving frame 5. Two bolt insertion holes 22B corresponding to each of the bolt insertion holes 5F1 provided in the front vertical leg part mounting plate 5F are drilled in the lower flange plate 22A.

A flat-plate shaped lateral flange plate 23A is provided on a tip end portion (left end portion) of the lateral leg part 23. This lateral flange plate 23A is in contact with the front lateral leg part mounting plate 5M provided on the right front engine support bracket. 5K. Two bolt insertion holes 23B corresponding to each of the bolt insertion holes 5M1 provided in the front lateral leg part mounting plate 5M are drilled in the lateral flange plate 23A.

The rear mounting leg 24 is arranged on the rear side of the front mounting leg 21 and forms a pair with the front mounting leg 21. The rear mounting leg 24 is constituted by the vertical leg part 25 extending in the vertical direction and the lateral leg part 26 extending from the upper end of the vertical leg part 25 toward the center frame 5A in the left and right direction. The rear mounting leg 24 is formed a substantial L-shape as a whole. A flat-plate shaped lower flange plate 25A is provided on the lower end portion of the vertical leg part 25, and this lower flange plate 25A is in contact with the rear vertical leg part mounting plate 5G provided on the right rear extension beam 5E3 of the revolving frame 5. Two bolt insertion holes 25B corresponding to each of the bolt insertion holes 5G1 provided in the rear vertical leg part mounting plate 5G are drilled in the lower flange plate 25A.

A flat-plate shaped lateral flange plate 26A is provided on a tip end portion (left end portion) of the lateral leg part 26. This lateral flange plate 26A is in contact with the rear lateral leg part mounting plate 5N provided on the right rear engine support bracket 5L. Two bolt insertion holes 26B corresponding to each of the bolt insertion holes 5N1 provided in the rear lateral leg part mounting plate 5N are drilled in the lateral flange plate 26A.

The deck 27 extends in the front and rear direction between the front mounting leg 21 and the rear mounting leg 24 and connects the both. This deck 27 extends in the front and rear direction across the hydraulic pump 11 and the exhaust gas post-treatment device 13 is mounted on the deck 27. Here, the deck 27 includes a the mounting stand 28 having a hollow angular tubular shape extending in the front and rear direction, a front plate 29 fixed to a front end of the mounting stand 28, a rear plate 30 fixed to a rear end of the mounting stand 28, and a partition member 32 which will be described later.

The mounting stand 28 has an upper surface 28A having a substantially rectangular shape extending in the front and rear direction and the side surface 28B extending vertically downward from the left end portion of the upper surface 28A. A long hole 28C extending in the front and rear direction is formed in a front part side of the side surface 28B. Four upper surface bolt holes 23A1 are formed in the upper surface 28A, and four side surface bolt holes 28B1 are formed in the side surface 28B.

As shown in FIG. 9, the bolt and nut 18B is inserted in each of the brackets 18A of the cylinder body 18 constituting the second exhaust gas post-treatment device 17. By inserting this bolt and nut 18B into the upper surface bolt hole 28A1 of the upper surface 28A of the mounting stand 28, the second exhaust gas post-treatment device 17 is mounted on the upper surface 28A of the mounting stand 28 (see FIG. 4). On the other hand, the bolt and nut 15B is inserted in each of the brackets 15A of the cylinder body 15 constituting the first exhaust gas post-treatment, device 14. By inserting this bolt and nut 15B into the side surface bolt hole 28B1 of the side surface 28B, the first exhaust gas post-treatment device 14 is mounted on the side surface 28B of the mounting stand 28 (see FIG. 4).

The front plate 29 is constituted by a vertical plate 29A extending in the left and right direction and a flat-plate shaped mounting plate 29B provided on a lower end portion of the vertical plate 23A. The vertical plate 29A of the front plate 29 is fixed to the front end portion of the mounting stand 28 by using means such as welding and the like. The mounting plate 29B of the front plate 29 is mounted on an upper end of the lateral leg part 23 constituting the front mounting leg 21 by using a bolt 31. On the other hand, the rear plate 30 is constituted by a vertical plate 30A extending in the left and right direction and a flat-plate shaped mounting plate 30B provided on a lower end portion of the vertical plate 30A. The vertical plate 30A of the rear plate 30 is fixed to the rear end portion of the mounting stand 28 by using means such as welding and the like. The mounting plate 30B of the rear plate 30 is mounted on an upper end of the lateral leg part 26 constituting the rear mounting leg 24 by using the bolt 31.

The partition member 32 constitutes the deck 27 together with the mounting stand 28. This partition member 32 covers an upper part of the hydraulic pump 11 from the mounting stand 28. Here, the partition member 32 has an inclined surface 32A inclined diagonally downward from the lower end of the side surface 28B constituting the mounting stand 28, and a horizontal surface 32B extending horizontally from a lower end of the inclined surface 32A toward the center frame 5A. Front ends of the inclined surface 32A and the horizontal surface 32B constituting the partition member 32 are fixed to the front plate 29 by using means such as welding and the like. Rear ends of the inclined surface 32A and the horizontal surface 32B are fixed to the rear plate 30 by using means such as welding and the like.

The first exhaust gas post-treatment device 14 is mounted on the side surface 28B of the mounting stand 28 constituting the deck 27. The second exhaust gas post-treatment device 17 is mounted on the upper surface 28A of the mounting stand 23. In this state, these first and second exhaust gas post-treatment devices 14 and 17 can be covered from a lower side by the mounting stand 28 and the partition member 32. Accordingly, by means of the mounting stand. 28 of the deck 27 and the partition member 32, the hydraulic pump 11 can be partitioned from the exhaust gas post-treatment device 13. Therefore, even if the hydraulic oil is splashed from a connection portion between the hydraulic pump 11 and a hydraulic hose (not shown), for example, it is constituted such that adhesion of the operating oil to the exhaust gas post-treatment device 13 can be suppressed.

Thus, the post-treatment device mounting frame 20 is formed by connecting the front mounting leg 21 and the rear mounting leg 24 through the deck 27. As shown in FIG. 5 and FIG. 6, the lower flange plate 22A of the vertical leg part 22 constituting the front mounting leg 21 is mounted on the front vertical leg part mounting plate 5F of the right front extension beam 5E2 constituting the revolving frame 5 by using two bolts and nuts 33. The lateral, flange plate 23A of the lateral leg part 23 constituting the front mounting leg 21 is mounted on the front lateral leg part mounting plate 5M fixed to the right front engine support bracket 5K at a position upper than the lower flange plate 22A by using two bolts 34.

On the other hand, the lower flange plate 25A of the vertical leg part 25 constituting the rear mounting leg 24 is mounted on the rear vertical leg part mounting plate 5G of the right rear extension beam 5E3 constituting the revolving frame 5 by using the two bolts and nuts 33. The lateral flange plate 26A of the lateral leg part 26 constituting the rear mounting leg 24 is mounted on the rear lateral leg part mounting plate 5N fixed to the right rear engine support bracket 5L at a position upper than the lower flange plate 25A by using the two bolts 34.

Therefore, the post-treatment device mounting frame 20 is firmly mounted in a state of four-point support to the revolving-frame 5. Accordingly, the post-treatment device mounting frame 20 can support the exhaust gas post-treatment device 13 with a large weight constituted by the first and second exhaust gas post-treatment devices 14 and 17 with sufficient rigidity. In this case, the right front engine support bracket 5K and the right rear engine support bracket 5L support the engine 9 through the vibration isolating member 10. Thus, by mounting the lateral leg part 23 of the front mounting leg 21 constituting the post-treatment device mounting frame 20 on the right front engine support bracket 5K and by mounting the lateral leg part 26 of the rear mounting leg 24 on the right rear engine support bracket 5L, accuracy of a mounting position of the exhaust gas post-treatment device 13 to the engine 9 can be improved. As a result, it is constituted such that mounting accuracy of the exhaust pipe 12 connecting the engine 9 and the first exhaust gas post-treatment device 14 can be improved, Moreover, the deck 27 of the post-treatment device mounting frame 20 extends in the front and rear direction across the hydraulic pump 11. Thus, even if a sufficient space cannot be ensured around the engine 9, it is constituted such that the exhaust gas post-treatment device 13 can be arranged by effectively utilizing a space formed on the upper side of the hydraulic pump 11.

The hydraulic excavator 1 according to this embodiment has the constitution described above, and subsequently, its operation will be described.

First, the operator gets onboard the cab 7 and operates the engine 9. Then, by operation by the operator of the operation, lever (not shown) for running arranged in the cab 7, the hydraulic excavator 1 can be made to run. Moreover, by operation by the operator of the operation lever (not shown) for work, an excavating work of earth and sand can be performed, by using the working mechanism 4.

Here, during operation of the engine 9, the exhaust gas exhausted from the engine 9 is led into the first exhaust gas post-treatment device 14 through the exhaust pipe 12. This exhaust gas passes from the first exhaust gas post-treatment device 14 through the connection pipe 16 and the second exhaust gas post-treatment device 17 and is exhausted to the air through the tail pipe 19.

As described above, in this embodiment, in order to sufficiently purify the exhaust gas from the engine 9, the exhaust gets post-treatment device 13 with a large weight constituted by the first and second exhaust gas post-treatment devices 14 and 17 is disposed on the revolving frame 5 by using the post-treatment device mounting frame 20.

In this case, the post-treatment device mounting frame 20 according to this embodiment is formed by connecting the front mounting leg 21 and the rear mounting leg 24 through the deck 27. The lower flange plate 22A of the vertical leg part 22 constituting the front mounting leg 21 is mounted on the front vertical leg part mounting plate 5F of the right front extension beam 5E2 by using the bolt and nut 33. The lateral flange plate 23A of the lateral leg part 23 is mounted, on the front lateral leg part mounting plate 5M of the right front engine support bracket 5K by using the bolt 34. On the other hand, the lower flange plate 25A of the vertical leg part 25 constituting the rear mounting leg 24 is mounted on the rear vertical leg part-mounting plate 5G of the right rear extension beam 5E3 by using the bolt and nut 33. The lateral flange plate 26A of the lateral leg part 26 is mounted on the rear lateral leg part mounting plate 5N of the right rear engine support bracket 5L by using the bolt 34.

Therefore, since the post-treatment device mounting frame 20 is firmly mounted in the state of four-point support to the revolving frame 5, it can support the exhaust gas post-treatment device 13 with a large weight constituted by the first and second exhaust gas post-treatment devices 14 and 17 with sufficient rigidity. Moreover, the right front engine support bracket 5K and the right rear engine support bracket 5L are for supporting the engine 9 through the vibration isolating member 10. Thus, by mounting the lateral leg part 23 of the front mounting leg 21 constituting the post-treatment device mounting frame 20 on the right front engine support bracket 5K and by mounting the lateral leg part 26 of the rear mounting leg 24 on the right rear engine support bracket 5L, accuracy of the mounting position of the exhaust gas post-treatment device 13 to the engine 9 can be improved.

As a result, the mounting accuracy of the exhaust pipe 12 connecting the engine 9 and the first exhaust gas post-treatment device 14 can be improved. Accordingly, by smoothly introducing a large amount of the exhaust gas into the first exhaust gas post-treatment device 14, the exhaust gas can be efficiently purified by the first and second exhaust gas post-treatment devices 14 and 17.

Moreover, in the post-treatment device mounting frame 20 according to this embodiment, the front mounting leg 21 connected to the deck 27 is constituted by the vertical leg part 22 extending in the vertical direction and the lateral leg part 23 extending from the upper end of the vertical leg part 22 toward the center frame 5A. On the other hand, the rear mounting leg 24 connected to the deck 27 is constituted by the vertical leg part 25 extending in the vertical direction and the lateral leg part 26 extending from the upper end of the vertical leg part 25 toward the center frame 5A.

Thus, the lower flange plate 22A of the vertical leg part 22 constituting the front mounting leg 21 can be mounted on the front vertical lea part mounting plate 5F of the right front extension beam 5E2, and the lateral flange plate 23A of the lateral leg part 23 can be mounted on the front lateral leg part mounting plate 5M of the right front engine support bracket 5K. Therefore, the interval in the left and right direction between the lower flange plate 22A and the lateral flange plate 23A mounted on the revolving frame 5 can be ensured large. On the other hand, the lower flange plate 25A of the vertical leg part 25 constituting the rear mounting leg 24 can be mounted on the rear vertical leg part mounting plate 5G of the right rear extension beam 5E3, and the lateral flange plate 26A of the lateral leg part 26 can be mounted on the rear lateral leg part mounting plate 5N of the right rear engine support bracket 5L. Therefore, the interval in the left and right direction between the lower flange plate 25A mounted on the revolving frame 5 and the lateral flange plate 26A can be ensured large.

As a result, in the post-treatment device mounting frame 20 according to this embodiment, vibration in the left and right direction can be suppressed by the front mounting leg 21 and the rear mounting leg 24, and the vibration in the front and rear direction can be suppressed by the deck 27 connecting the front mounting leg 21 and the rear mounting leg 24. Accordingly, the post-treatment device mounting frame 20 can stably support the exhaust gas post-treatment device 13 for a long period of time.

Moreover, in the post-treatment device mounting frame 20 according to this embodiment, by providing the deck 27 extending in the front and rear direction across the hydraulic pump 11 and by mounting the exhaust gas post-treatment device 13 on this deck 27, the exhaust gas post-treatment device 13 can be arranged on the upper side of the hydraulic pump 11. As a result, even if a sufficient space cannot be ensured around the engine 9 as the rear small-revolving type hydraulic excavator, for example, the exhaust gas post-treatment device 13 can be arranged by effectively utilizing the space formed on the upper side of the hydraulic pump 11.

On the other hand, in the post-treatment device mounting frame 20 according to this embodiment, the partition member 32 constituted by the inclined surface 32A inclined diagonally downward from the lower end of the mounting stand 23 and the horizontal surface 32B extending horizontally from the lower end of the inclined surface 32A toward the center frame 5A is provided on the deck 27. Therefore, in the state in which the first exhaust gas post-treatment device 14 is mounted on the side surface 28B of the mounting stand 28 and the second exhaust gas post-treatment device 17 mounted on the upper surface 28A of the mounting stand 28, the hydraulic pump 11 can be partitioned from the first and second exhaust, gas post-treatment devices 14 and 17 by the mounting stand 28 and the partition member 32.

As a result, even if hydraulic oil is splashed from the connection portion between the hydraulic pump 11 and the hydraulic hose (not shown), for example, adhesion of the hydraulic oil to the first and second exhaust gas post-treatment devices 14 and 17 and causing a misfire can be reliably prevented, and reliability of the hydraulic excavator 1 can be improved.

It should be noted that in the embodiment described above, the hydraulic excavator 1 provided with the crawler-type lower traveling structure 2 is described as an example of the construction machine. However, the present invention is not limited thereto and may be applied to a hydraulic excavator provided with a wheel-type lower traveling structure, for example. Other than that, the present invention can be widely applied to other construction machines such as a wheel loader, a damp truck, a hydraulic crane and the like.

DESCRIPTION OF REFERENCE NUMERALS

2: Lower traveling structure (Vehicle body)
3: Upper revolving structure (Vehicle body)
5: Revolving frame (Vehicle body frame)
5A: Center frame
5A1: Bottom plate
5A2: Left vertical plate
5A3: Right vertical plate
5B: Left side frame
5C: Right side frame
5D1, 5D2, 5D3: Left extension beam
5E1, 5E2, 5E3: Right extension beam
5H: Left front engine support bracket
5J: Left rear engine support bracket
5K: Right front engine support bracket
5L: Right rear engine support bracket
9: Engine
11: Hydraulic pump
12: Exhaust pipe
13: Exhaust gas post-treatment device
20: Post-treatment device mounting frame
21: Front mounting leg
22, 25: Vertical leg part 23, 26: Lateral leg part
24: Rear mounting leg
27: Deck
28: Mounting stand
32: Partition member

The invention claimed is:
1. A construction machine comprising:
a vehicle body frame forming a support structural body of a vehicle body;
an engine mounted on said vehicle body frame in a laterally placed state extending in a left and right direction;
a hydraulic pump mounted on said engine by being located on one side of said engine in the left and right direction;
an exhaust gas post-treatment device connected to said engine through an exhaust pipe and executing post-treatment to the exhaust gas exhausted from said engine; and
a post-treatment device mounting frame provided on said vehicle body frame and on which said exhaust gas post-treatment device is mounted; wherein said vehicle body frame includes:
a center frame having a bottom plate and left and right vertical plates installed upright on said bottom plate and extending in a front and rear direction,
a left side frame arranged on a left side of said center frame and extending in the front and rear direction,
a right side frame arranged on a right side of said center frame and extending in the front and rear direction,
a plurality of extension beams extending in the left and right direction at an interval in the front and rear direction in order to connect said left and right side frames and said center frame to each other,
a left front engine support bracket and a left rear engine support bracket provided separately to a front side and a rear side respectively on said left vertical plate side of the rear side of said center frame and supporting said engine through a vibration isolating member, and
a right front engine support bracket and a right rear engine support bracket provided separately to a front side and a rear side respectively on said right vertical plate side of the rear side of said center frame and supporting said engine through said vibration isolating member,
wherein said post-treatment device mounting frame includes:
a front mounting leg mounted on said right front engine support bracket and said front extension beam which is closest to said right front engine support bracket in said plurality of extension beams, respectively,
a rear mounting leg mounted on said right rear engine support bracket and said rear extension beam which is closest to said right rear engine support bracket in said plurality of extension beams, respectively,
a deck extending in the front and rear direction between said front mounting leg and said rear mounting leg and connecting upper part positions of said front mounting leg and said rear mounting leg, wherein
said exhaust gas post-treatment device is mounted on said deck of said post-treatment device mounting frame.

2. The construction machine according to claim 1, wherein
said deck of said post-treatment device mounting frame is constituted to extend in the front and rear direction across said hydraulic pump.

3. The construction machine according to claim 1, wherein
said deck of said post-treatment device mounting frame is constituted by a mounting stand on which said exhaust gas post-treatment device is mounted and a partition member covering above said hydraulic pump and partitioning said hydraulic pump from said exhaust gas post-treatment device.

4. The construction machine according to claim 1, wherein
said front mounting leg of said post-treatment device mounting frame is constituted by a vertical leg part extending in the vertical direction and having a lower end portion mounted on said front extension beam and a lateral leg part extending from an upper end of said vertical leg part toward said center frame and mounted on said front engine support bracket;
said rear mounting leg of said post-treatment device mounting frame is constituted by a vertical leg part extending in the vertical direction and having a lower end portion mounted on said rear extension beam and a lateral leg part extending from the upper end of said vertical leg part toward said center frame and mounted on said rear engine support bracket; and
said deck of said post-treatment device mounting frame is constituted to have its front side mounted on an upper part of said lateral leg part constituting said front mounting leg and its rear side mounted on the upper part of said lateral leg part constituting said rear mounting leg.

* * * * *